US012653351B2

(12) United States Patent
Buday et al.

(10) Patent No.: US 12,653,351 B2
(45) Date of Patent: Jun. 16, 2026

(54) TOUCH FREE DISPENSERS HAVING IMPROVED HAND SENSING

(71) Applicant: GOJO Industries, Inc., Akron, OH (US)

(72) Inventors: Dan Buday, Akron, OH (US); Jackson W. Wegelin, Stow, OH (US); Nick E. Ciavarella, Seven Hills, OH (US); Steven L. Keegan, Walton Hills, OH (US)

(73) Assignee: GOJO Industries, Inc., Akron, OH (US)

( * ) Notice: Subject to any disclaimer, the term of this patent is extended or adjusted under 35 U.S.C. 154(b) by 205 days.

(21) Appl. No.: 18/349,363

(22) Filed: Jul. 10, 2023

(65) Prior Publication Data

US 2024/0016346 A1 Jan. 18, 2024

Related U.S. Application Data

(60) Provisional application No. 63/388,371, filed on Jul. 12, 2022.

(51) Int. Cl.
*A47K 5/12* (2006.01)
*G01S 17/04* (2020.01)
*G01S 17/88* (2006.01)

(52) U.S. Cl.
CPC ............ *A47K 5/1217* (2013.01); *G01S 17/04* (2020.01); *G01S 17/88* (2013.01)

(58) Field of Classification Search
CPC .......... A47K 5/1217; A47K 2005/1218; G01S 17/04; G01S 17/88
See application file for complete search history.

(56) References Cited

U.S. PATENT DOCUMENTS

| | | | |
|---|---|---|---|
| 5,758,688 A | 6/1998 | Hamanaka et al. | |
| 5,868,311 A | 2/1999 | Cretu-Petra | |
| 7,611,030 B2 | 11/2009 | Reynolds et al. | |
| 7,621,426 B2 | 11/2009 | Reynolds et al. | |
| 7,837,066 B2 | 11/2010 | Reynolds et al. | |
| 7,896,196 B2 | 3/2011 | Wegelin et al. | |
| 7,909,209 B2 | 3/2011 | Reynolds et al. | |
| 8,960,498 B2 | 2/2015 | Wegelin et al. | |
| 9,172,266 B2 | 10/2015 | Curtis et al. | |
| 9,603,494 B1 * | 3/2017 | Wang .................. | A47K 5/1217 |

(Continued)

FOREIGN PATENT DOCUMENTS

| | | |
|---|---|---|
| EP | 347527 A1 | 12/1989 |

OTHER PUBLICATIONS

International Search Report and Written Opinion from PCT/US2023/069858 dated Oct. 19, 2023.

*Primary Examiner* — Donnell A Long
(74) *Attorney, Agent, or Firm* — Calfee, Halter & Griswold LLP

(57) ABSTRACT

An exemplary touch-free dispenser includes a housing, a dispenser outlet, a processor, a memory, an IR emitter and an IR receiver. Wherein the IR emitter and the IR receiver are arranged in a vertical orientation. Wherein the IR emitter has an IR emitter alignment axis and wherein the IR receiver has an IR receiver alignment axis. The IR emitter alignment axis intersects with the IR receiver alignment axis, and wherein a detection zone includes the intersection of IR emitter alignment axis and the IR receiver alignment axis.

22 Claims, 7 Drawing Sheets

(56)　　　　　References Cited

U.S. PATENT DOCUMENTS

| | | | |
|---|---|---|---|
| 9,706,883 B2 * | 7/2017 | Shakkour | A47K 5/1217 |
| 10,278,549 B1 * | 5/2019 | Carignan | A47K 5/1217 |
| 10,450,731 B2 * | 10/2019 | McHale | E03C 1/046 |
| 10,460,549 B2 | 10/2019 | Wegelin | |
| 10,722,080 B2 * | 7/2020 | Ciavarella | A47K 5/14 |
| 11,122,939 B2 | 9/2021 | Ciavarella et al. | |
| 11,234,563 B2 * | 2/2022 | Bai | A47K 5/14 |
| 11,662,753 B2 * | 5/2023 | Birchfield | G05D 23/1393 |
| | | | 4/678 |
| 2009/0045221 A1 * | 2/2009 | Ophardt | A47K 5/1217 |
| | | | 222/372 |
| 2013/0001241 A1 * | 1/2013 | Ophardt | A47K 5/1217 |
| | | | 222/1 |
| 2013/0020351 A1 | 1/2013 | Pelfrey | |
| 2014/0124540 A1 | 5/2014 | Ciavarella et al. | |
| 2015/0157754 A1 | 6/2015 | Rutter et al. | |
| 2015/0268342 A1 * | 9/2015 | Iott | G01S 17/06 |
| | | | 222/1 |
| 2016/0177550 A1 * | 6/2016 | Sawaski | E03C 1/057 |
| | | | 137/78.1 |
| 2016/0309967 A1 * | 10/2016 | Pelfrey | A47K 5/1217 |
| 2018/0023274 A1 | 1/2018 | Song | |

* cited by examiner

600A 613
612
640
648
A
620A
605
624A
604
630B
602
634A 634A
624B

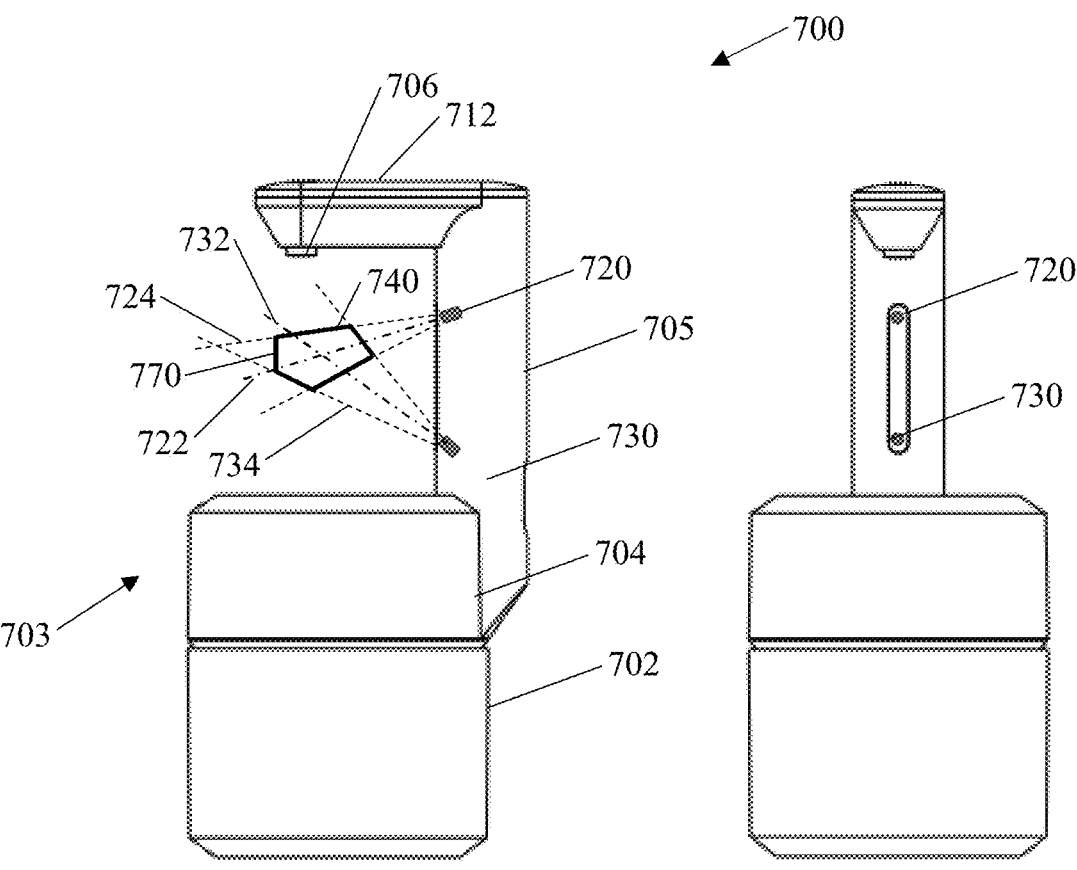
FIG. 7A          FIG. 7B

TOUCH FREE DISPENSERS HAVING IMPROVED HAND SENSING

RELATED APPLICATIONS

The present application claims priority to, and the benefits of, U.S. Provisional Patent Application Ser. No. 63/388,371, titled TOUCH FREE DISPENSERS HAVING IMPROVED HAND SENSING, which was filed on Jul. 12, 2022, and which is incorporated herein in its entirety.

TECHNICAL FIELD

The present invention relates generally to touch free dispenser systems and more particularly to touch free dispensers that have improved hand sensing properties.

BACKGROUND OF THE INVENTION

Touch free dispensers for dispensing soap and sanitizer have hand sensing technology that often results in unintentional dispensing of fluid. Some touch free sensors utilize infrared (IR) emitters and receivers to detect a person's hand. The prior art sensors, such as, for example, those shown in FIG. 1, which is an exemplary counter mount dispenser 100. The dispenser 100 is mounted to a countertop proximate a sink (not shown). The dispenser has a base 104, a soap outlet 106, an IR emitter 120 and an IR receiver 130. The IR emitter 120 and IR receiver 130 are arranged in parallel as indicated by alignment axis lines 122 and 132. The IR emitter 120 projects out indefinitely, and the IR receiver 130 looks out indefinitely. As a result, signals from the IR emitter 120 may be bounced back to the IR receiver from far away from the dispenser 100, particularly from a reflective surface, such as, for example, a reflective vest, a white shirt, a watch, or the like.

The IR emitter 120 and IR receiver 130 each have a cone 124, 134 respectively, that extend outward from the IR emitter 120 and IR receiver 130 symmetrically about the alignment axis lines 122, 132. The location 140 that the IR emitter cone 124 and IR receiver cone 134 intersect is the "sensing zone" 140. Objects located in the sensing zone 140 reflect IR light from the IR emitter 120 back to the IR receiver 130, which causes the dispenser to dispense a dose of fluid. The prior art systems need to be calibrated to a selected distance to prevent triggering by objects that are inside the sensing zone, but outside of the selected distance from the sensor. Overtime, the prior art sensors may need to be recalibrated. In wet environments, the need to recalibrate the prior art sensors, may result in an inability to protect the prior art sensors from, for example, wet environments.

In addition, the prior art sensors are subject to unintended or unintentional dispensing due to changes in the environment, such as, for example, changes in light levels. An exemplary prior art system is shown in U.S. Pat. No. 5,758,688. In addition, as disclosed in U.S. Pat. No. 7,896, 196, changes in ambient light, may affect the prior art sensors.

In addition to needing to be calibrated, to prevent false triggering, prior art IR sensors take a number of discrete readings over a time period, average the readings, and if the average of the readings are over a set limit, then the IR sensors will signal that there is an object in its detection zone.

SUMMARY

Exemplary embodiments of touch-free dispensers having improved hand sensing capabilities. An exemplary touch-free dispenser includes a housing, a dispenser outlet, a processor, a memory, an IR emitter and an IR receiver. Wherein the IR emitter and the IR receiver are arranged in a vertical orientation. Wherein the IR emitter has an IR emitter alignment axis and wherein the IR receiver has an IR receiver alignment axis. The IR emitter alignment axis intersects with the IR receiver alignment axis, and wherein a detection zone includes the intersection of IR emitter alignment axis and the IR receiver alignment axis.

Another exemplary touch-free dispenser includes a housing. The housing has an upward extending portion in a forward extending portion. The dispenser includes a dispenser outlet located on the forward extending portion. The dispenser further includes a processor, a memory, an actuator, and an IR sensor. The IR sensor includes an IR emitter and an IR receiver. The IR emitter and the IR receiver are arranged one above the other. The IR emitter has an IR emitter alignment axis and the IR receiver has an IR receiver alignment axis. The IR emitter is secured to the upright extending portion and the IR receiver is secured to the upright extending portion. The IR emitter alignment axis and the IR receiver alignment axis converge toward one another. The IR emitter has an emissions cone; and the IR receiver has a receiver cone. The emissions cone and the receiver cone intersect and a detection zone is located in the intersection of the emissions cone and the receiver cone. When the IR sensor detects an object in the detection zone, the processor causes the actuator to dispense a dose of fluid.

Another exemplary touch-free dispenser includes a housing. The housing has an upward extending portion in a forward extending portion. The dispenser further includes a dispensing outlet that is located on the forward extending portion. In addition, the dispenser includes a processor, a memory, an actuator and an IR sensor. The IR sensor includes an IR emitter and an IR receiver. The IR emitter and the IR receiver are arranged one above the other. The IR emitter has an IR emitter alignment axis and the IR receiver has an IR receiver alignment axis. The IR emitter alignment axis and the IR receiver alignment axis intersect one another before the IR emitter alignment axis and the IR receiver alignment axis pass an outermost end of the forward extending section of the housing. The IR emitter has an emissions cone and the IR receiver has a receiver cone. A detection zone is located in the intersection of the emissions cone and the receiver cone and the detection zone is located below the dispensing outlet. When the IR sensor detects an object in the detection zone, the processor causes the actuator to dispense a dose of fluid.

BRIEF DESCRIPTION OF THE DRAWINGS

These and other features and advantages of the present invention will become better understood with regard to the following description and accompanying drawings in which:

FIGS. 7A and 7B are a side view and a front view an exemplary embodiment of another dispenser with an improved hand sensor.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions. The exemplary methodologies provide instructions for creating logic to control desired functions.

Values identified in the detailed description may be exemplary and may be different as needed for a particular dispenser and/or refill design. Accordingly, the inventive concepts disclosed and claimed herein are not limited to the particular values or ranges of values used to describe the embodiments disclosed herein.

Figure 1:
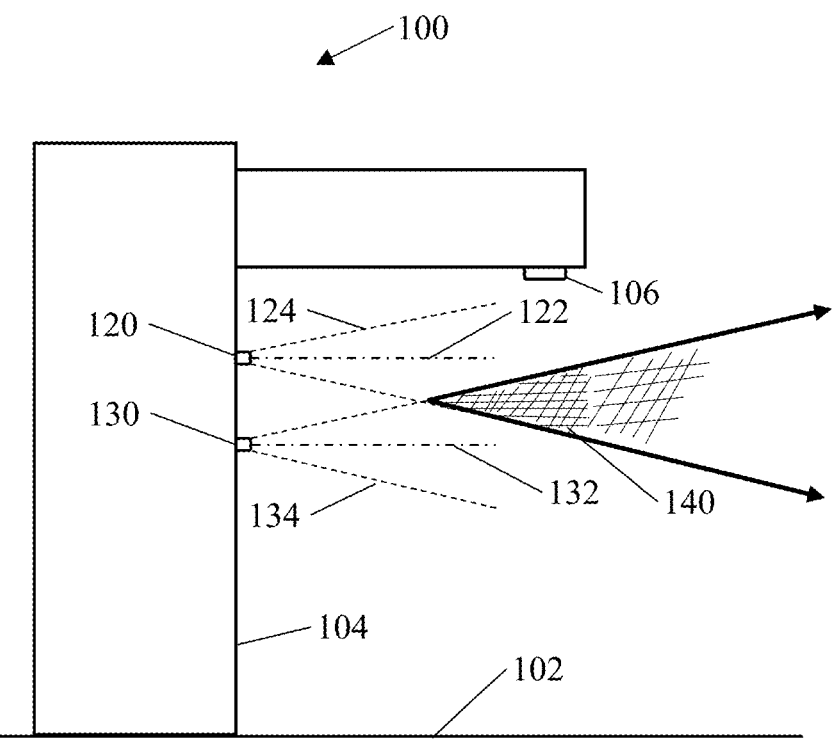
FIG. 1 is a schematic view of a prior art touch-free dispenser with a prior art hand sensor.
Figure 2:
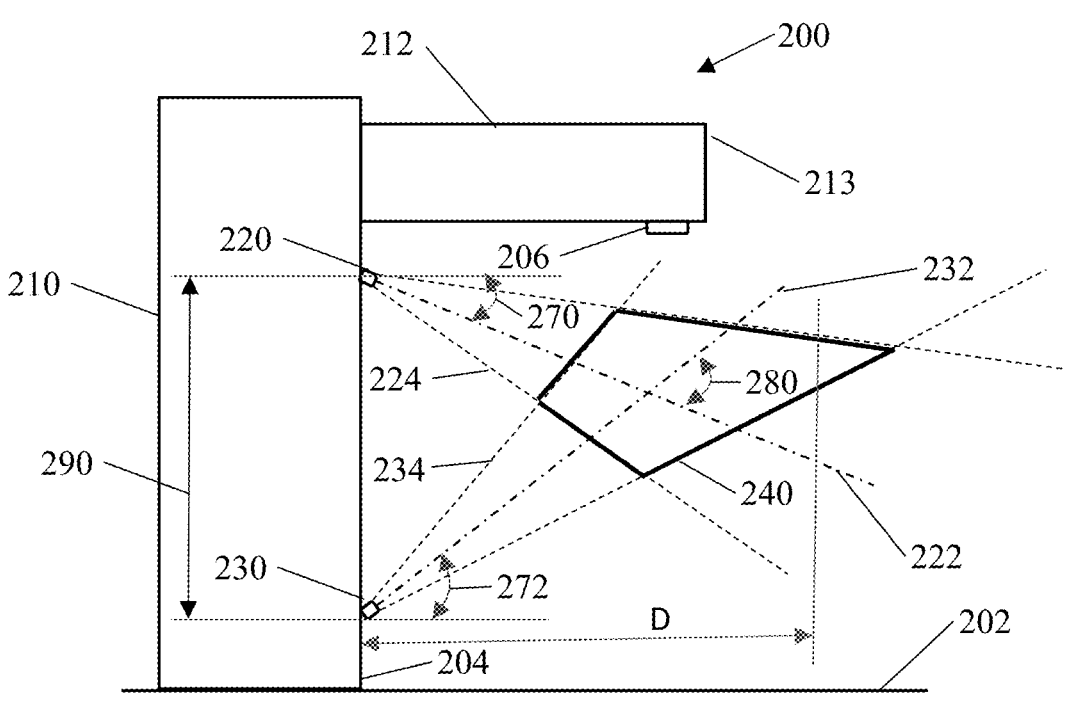
FIG. 2 is a schematic view of a touch-free dispenser with an improved hand sensor.

FIG. 2 is a simplified schematic diagram of a touch-free dispenser 200. Dispenser 200 may be any type of touch-free dispenser, such as, for example, a counter-mount dispenser located by a sink for dispensing soap, a countertop dispenser that sits on a table-top for dispensing soap or sanitizer, a wall mounted dispenser, or the like.

Exemplary touch-fee dispensers are shown and described in U.S. Pat. No. 7,837,066 titled Electronically Keyed Dispensing System And Related Methods Utilizing Near Field Response; U.S. Pat. No. 9,172,266 title Power Systems For Touch Free Dispensers and Refill Units Containing a Power Source; U.S. Pat. No. 7,909,209 titled Apparatus for Hands-Free Dispensing of a Measured Quantity of Material; U.S. Pat. No. 7,611,030 titled Apparatus for Hands-Free Dispensing of a Measured Quantity of Material; U.S. Pat. No. 7,621,426 titled Electronically Keyed Dispensing Systems and Related Methods Utilizing Near Field Response; and U.S. Pat. No. 8,960,498 titled Touch-Free Dispenser with Single Cell Operation and Battery Banking; U.S. Pat. Pub. No. 2013/0020351 titled Dispenser With Optical Keying System; U.S. Pat. Pub. No. 2014/0124540 titled Under-Counter Mount Foam Dispensing Systems With Permanent Air Compressors And Refill Units For Same; U.S. Pat. Pub. No 2015/0157754 titled Dispensers For, And Methods Of, Disinfecting Hands; U.S. Pat. No. 10,460,549 titled Systems and methods for device usage monitoring and U.S. Pat. No. 11,122,939 titled Fluid dispenser and fluid refill system for fluid dispenser; all which are incorporated herein by reference.

Touch-free dispenser 200 is mounted to a countertop 202 near a sink (not shown) and includes a housing 204. Housing 204 has an upward extending portion 210 and a forward extending portion 212. A dispensing outlet 206 is located in the forward extending portion 212. The forward extending portion 212 has an end point 213.

Located in the upward extending portion 210 of the hosing 204 is an Infrared ("IR") emitter 220 and an IR receiver 230. In this exemplary embodiment, the IR emitter 220 is located above the IR receiver 230. In some embodiments, the IR receiver 230 is located above the IR emitter 220. In some embodiments, one of the IR emitter 220 and the IR receiver 330 may be located in the forward extending portion 212.

The IR emitter 220 and the IR receiver 330 are arranged in a vertical orientation. It has been found that having the IR emitter 220 and the IR receiver 330 arranged in a vertical orientation result in increased hand sensing accuracy and fewer false triggering s. In some embodiments, the center of the IR emitter 220, the center of the IR receiver 330 and the center of the dispensing outlet 206 are coplanar.

IR emitter 220 has an alignment axis 222. The IR emitter 220 is secured to the upward extending portion 210 of housing 204. In this exemplary embodiment, the IR emitter 220 is mounted at an angle 270 with respect to a horizontal axis. In some embodiments, angle 270 is between about 10 degrees and 45 degrees. In some embodiments, angle 270 is between about 15 degrees and 35 degrees. In some embodiments, angle 270 is between about 18 degrees and 30 degrees. In some embodiments, angle 270 is between about 20 degrees and 25 degrees. In some embodiments, angle 270 is between about 22.5 degrees.

IR receiver 230 has an alignment axis 232. The IR receiver 230 is secured to the upward extending portion 210 of housing 204. In this exemplary embodiment, the IR receiver 230 is mounted at an angle 272 with respect to a horizontal axis. In some embodiments, angle 272 is between about 10 degrees and 45 degrees. In some embodiments, angle 272 is between about 15 degrees and 35 degrees. In some embodiments, angle 272 is between about 18 degrees and 30 degrees. In some embodiments, angle 272 is between about 20 degrees and 25 degrees. In some embodiments, angle 272 is between about 22.5 degrees.

In the improved hand sensor, it is critical that the IR emitter alignment axis 222 and the IR receiver alignment axis 232 intersect. In this exemplary embodiment, the IR emitter alignment axis 222 and the IR receiver alignment axis 232 intersect at an angle of intersection 280. In some embodiments, the angle of intersection 280 is between 10 degrees and 90 degrees. In some embodiments, the angle of intersection 280 is between 20 degrees and 80 degrees. In some embodiments, the angle of intersection 280 is between 30 degrees and 70 degrees. In some embodiments, the angle of intersection 280 is between 40 degrees and 60 degrees. In some embodiments, the angle of intersection 280 is between 40 degrees and 50 degrees.

In embodiments wherein one of the IR emitter 220 and IR receiver 230 are mounted in the forward extending portion 212, the mounting angle may be adjusted accordingly so that the angle of intersection 280 is within the specified parameters.

IR emitter 220 and IR receiver 230 are preferably spaced apart by as much distance as is feasible. In some embodiments, IR emitter 220 and IR receiver 230 are spaced apart by a distance of at least 10 mm. In some embodiments, IR emitter 220 and IR receiver 230 are spaced apart by a distance of at least 15 mm. In some embodiments, IR emitter 220 and IR receiver 230 are spaced apart by a distance of at least 20 mm. In some embodiments, IR emitter 220 and IR receiver 230 are spaced apart by a distance of at least 25 mm. In some embodiments, IR emitter 220 and IR receiver 230 are spaced apart by a distance of at least 30 mm. In some embodiments, IR emitter 220 and IR receiver 230 are spaced apart by a distance of at least 35 mm. In some embodiments, IR emitter 220 and IR receiver 230 are spaced apart by a distance of at least 40 mm. In some embodiments, IR emitter 220 and IR receiver 230 are spaced apart by a distance of at least 45 mm. In some embodiments, IR emitter 220 and IR receiver 230 are spaced apart by a distance of at least 50 mm.

IR emitter 220 has an IR emission cone 224. Emission cone 224 is preferably symmetrical about alignment axis 222. IR receiver 230 has a detection cone 234. Detection cone 234 is preferably symmetrical about IR receiver alignment axis 232.

As can be seen from FIG. 2, IR emission cone 224 and the IR detection cone 234 intersect with one another. The area that the IR emission cone 224 and IR detection cone 234 intersect is the detection zone 240. Once IR light from the IR emission cone 224 extends beyond the IR detection cone 234 the IR light will not be reflected back to the IR receiver 230 by an object outside of the detection zone 240.

As a result, calibration of the innovative hand sensing technology is not as critical as it is in the prior art systems. Accordingly, in some embodiments, the IR emitter 220, IR receiver 230 and associated circuitry may be hermetically sealed, which was not possible in prior art systems that needed to be recalibrated periodically.

While it may not be critical to calibrate the sensor when the emitter and receiver alignment axises are configured to intersect, the sensors may be calibrated to a maximum distance D, which is shown in FIG. 2. Thus, the detection zone may be defined in part by a maximum distance from one or both of the emitter and the receiver.

Figure 3:
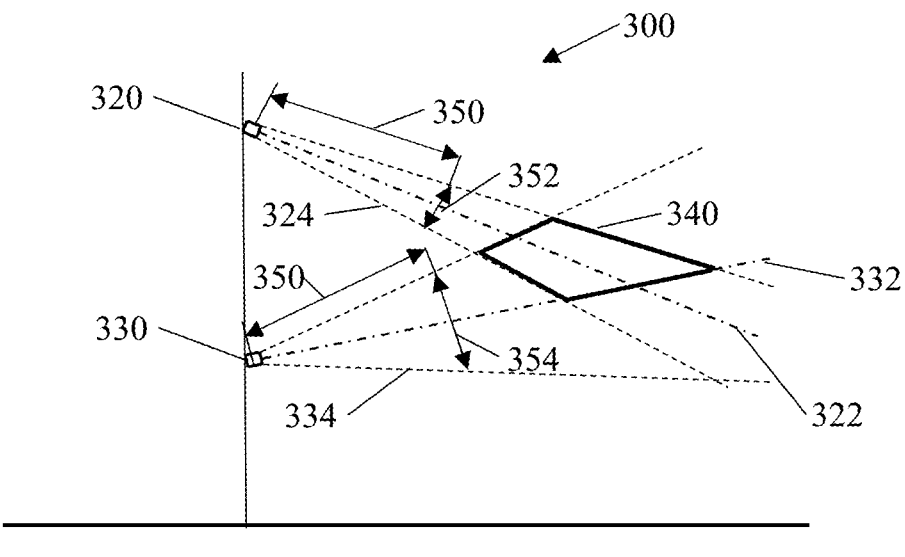
FIGS. 3 and 4 are schematic views of additional embodiments of an improved hand sensor for a touch-free dispenser.

FIG. 3 is an exemplary embodiment of an improved hand sensor 300 for a touch fee dispenser. The improved hand sensor 300 is similar to the hand sensors described above with respect to dispensing systems. In this exemplary embodiment, IR emitter 320 has an alignment axis 322 and emission cone 324. IR receiver 330 has an alignment axis 332 and a receiver cone 334. In this exemplary embodiment, IR emitter 320 is located above IR receiver 330. In some embodiments, IR receiver 330 is located above IR emitter 320. The intersection of IR emission cone 324 and IR receiver cone 334 defines a detection zone 340. In some embodiments, the sensor 300 is calibrated to a selected distance away from the IR sensor 320 and IR emitter 330. In this exemplary embodiment, the diameter 352 of emitter cone 324 at a distance 350 from the IR emitter 320 is greater than the diameter 354 of IR receiver cone 334 at the same distance 350 from the IR receiver 330. In some embodiments, the diameter 352 of emitter cone 324 at a distance 350 from the IR emitter 320 is less than the diameter 354 of IR receiver cone 334 at the same distance 350 from the IR receiver 330. It has been found that having the IR emitter 320 and the IR receiver 330 arranged in a vertical orientation result in increased hand sensing accuracy and fewer false triggerings.

Figure 4:
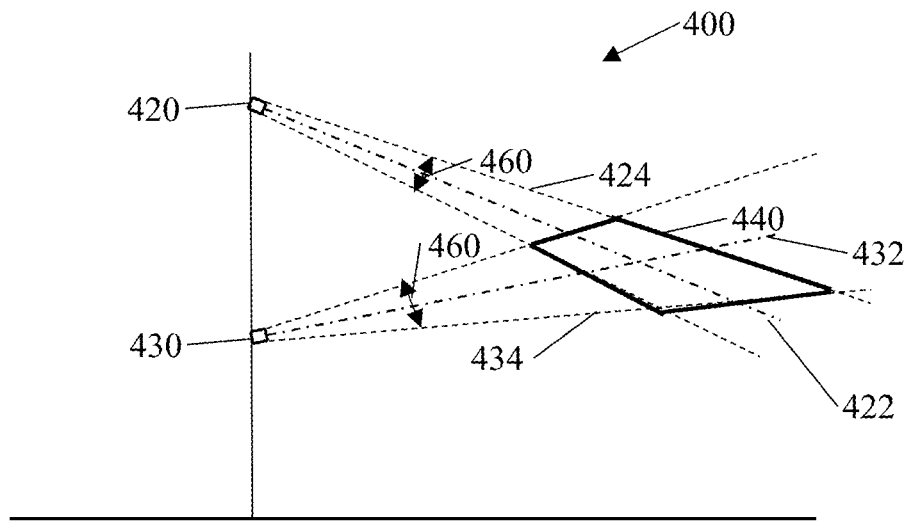

FIG. 4 is an exemplary embodiment of an improved hand sensor 400 for a touch fee dispenser. The improved hand sensor 400 is similar to the hand sensors described above with respect to dispensing systems. In this exemplary embodiment, IR emitter 420 has an alignment axis 422 and emission cone 424. IR receiver 430 has an alignment axis 432 and a receiver cone 434. In this exemplary embodiment, IR emitter 420 is located above IR receiver 430. In some embodiments, IR receiver 430 is located above IR emitter 420. The intersection of IR emission cone 424 and IR receiver cone 344 defines a detection zone 440. In some embodiments, the sensor 400 is calibrated to a selected distance away from the IR sensor 420 and IR emitter 430. In this exemplary embodiment, the diameter 460 of emitter cone 424 of IR emitter 420 is the same size as the diameter of IR receiver cone 434 at any given identical distance from their respective IR emitter 420 or IR receiver 430.

Figure 5:
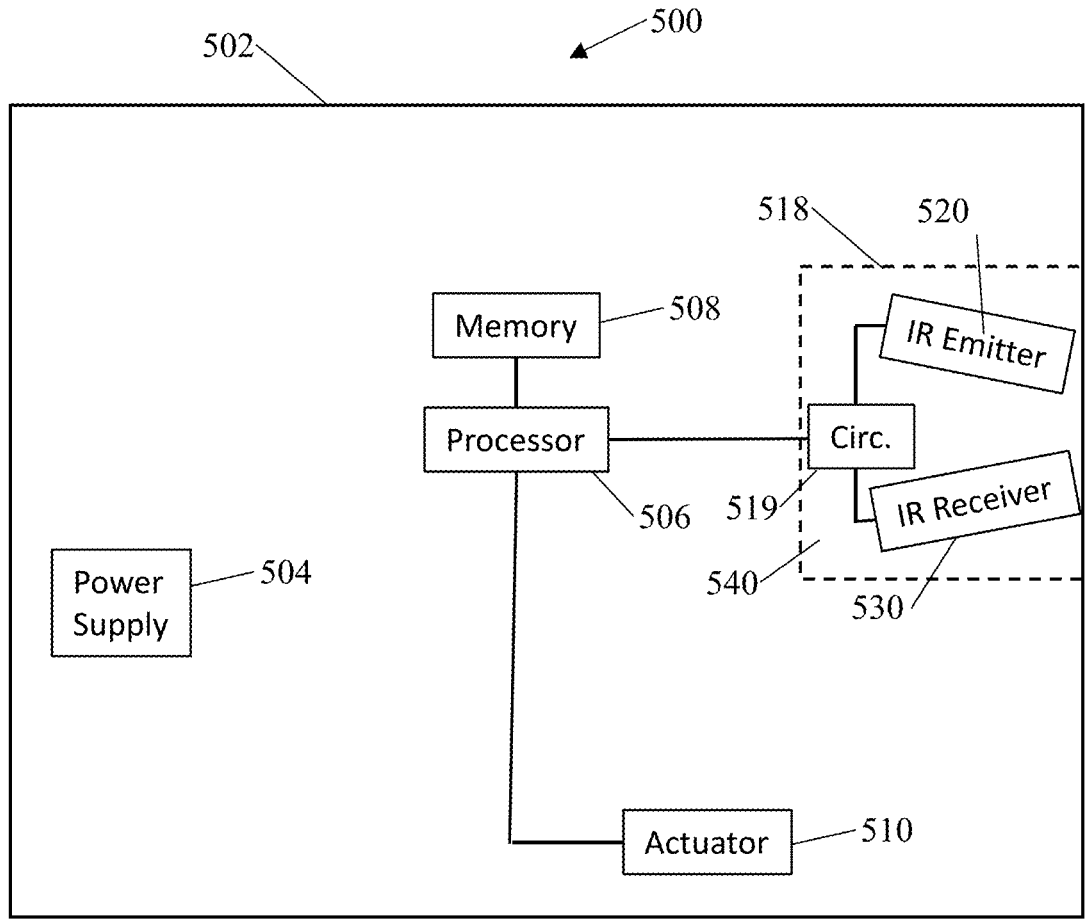
FIG. 5 is a simplified electrical schematic diagram of an improved hand sensor.

FIG. 5 is a simplified schematic of a dispenser system 500 having an improved hand sensor 518. It should be understood that additional electrical components may be included in the dispenser system 500 that are not shown herein, but would be understood by one of ordinary skill in the art to be included herein, such as, for example, power conditioning circuitry. The exemplary dispenser system 500 includes processor 506, which is in circuit communication with memory 508. Processor 506 may be any type of processor, such as, for example, a microprocessor or microcontroller, discrete logic, such as an application specific integrated circuit (ASIC), other programmed logic device or the like. Depending on the need, memory 508 may be any type of memory, such as, for example, Random Access Memory (RAM); Read Only Memory (ROM); programmable read-only memory (PROM), electrically programmable read-only memory (EPROM), electrically erasable programmable read-only memory (EEPROM), flash, magnetic disk or tape, optically readable mediums including CD-ROM and DVD-ROM, or the like, or combinations of different types of memory. In some embodiments, the memory 508 is separate from the processor 506, and in some embodiments, the memory 508 resides on or within processor 506.

Power supply 504 may be used to power any of the electrical components in the dispenser system, including for example, actuator 510, sensor 518, processor 506, and any other electrical components required for dispensing products as described herein. In some embodiments, power supply 504 is one or more batteries. In some embodiments, power supply 504 is a connector for connecting to an AC power supply, such as, for example, 120 VAC.

Sensor 518 is an IR sensor and includes an IR emitter 520 and an IR receiver 530. IR emitter 520 and IR receiver 530 are connected to IR circuitry 519. In some embodiments, IR emitter 520, IR receiver 530 and IR circuitry 519 are mounted on a circuit board 540. In some embodiments, circuit board 540, IR emitter 520, IR receiver 530, IR circuitry 519 are hermetically sealed because the sensor is to be used in a wet environment, such as, for example, next to a sink. In this exemplary embodiment, the IR emitter 520 and IR receiver 530 are mounted to the circuit board 540 with their alignment axis angles pre-set.

Sensor 518 is in circuit communications with processor 506. When an object is detected in the detection zone of sensor 518, the processor causes the actuator 510 to actuate and dispense dose of fluid.

The processor 506 and/or IR circuitry 519 control the sensor 518. In some exemplary embodiments, processor 506 and/or IR circuitry 519 detect "ambient" voltages, which are voltage values on the IR circuitry 520 that are due to ambient light and or ambient light changes. This is done to prevent ambient light and/or changes in ambient light from triggering s false dispenses and/or from preventing detection of objects in the detection zone. An exemplary method for dealing with ambient light is shown and described in U.S. Pat. No. 7,896,196 titled Fluid Dispenser Having Infrared User Sensor, which is incorporated herein in its entirety.

In addition, it has been discovered that because the emitter alignment axis and the receiver alignment axis intersect, an object being in the detection zone may be accurately detected by a single voltage spike over a set voltage. Accordingly, unlike the prior art, which require an average reading to be over a set limit, the instant configuration may accurately detect the presence of an object much quicker than the prior art sensor technology, without increasing false dispensing.

Figure 6:
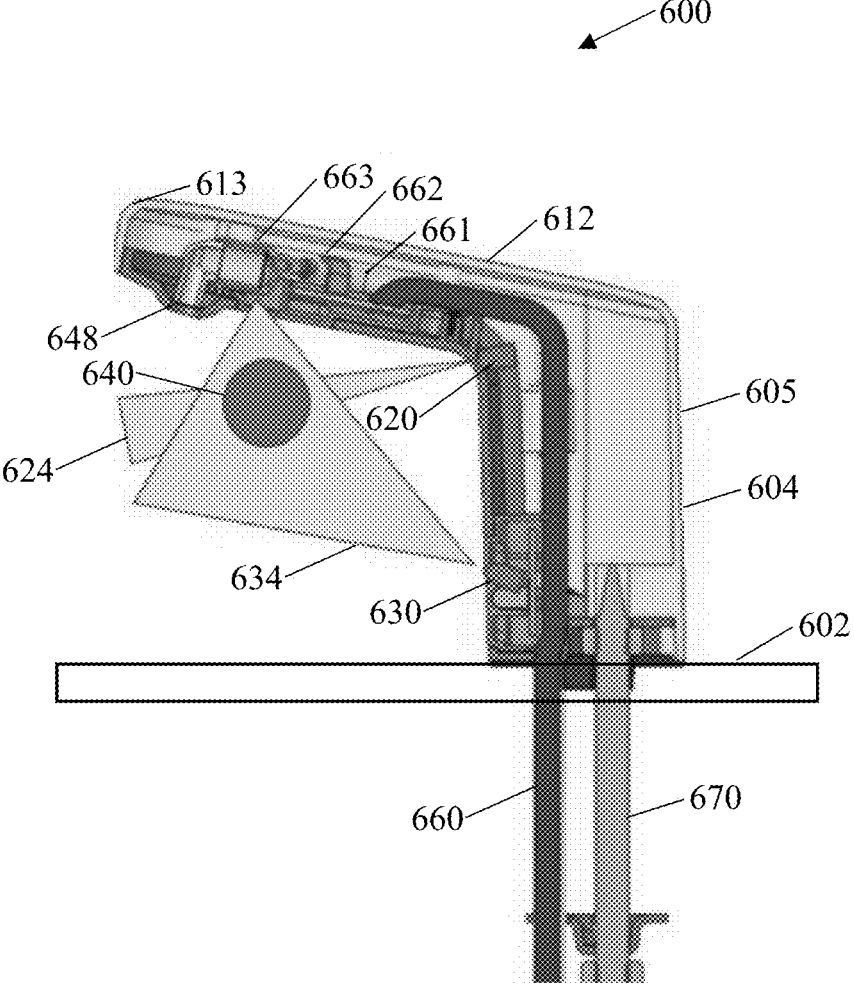
FIG. 6 is a cross-sectional view of a portion of an exemplary embodiment of a dispenser with an improved hand sensor.

FIG. 6 is an exemplary embodiment of a portion of a counter mount dispenser 600. Counter mount dispenser 600 includes a faucet shaped housing 604. Housing 604 has an upright portion 605 and a forward extending portion 612. Housing 604 is mounted to a counter 602 using a threaded rod 670. Dispenser 600 is a foam dispenser and a liquid conduit 660, air conduit 661, which meet at a mixing chamber 662. A foam generator 663 is in fluid communication with the mixing chamber 662 and dispensing outlet 648. The liquid conduit 602 connects to a liquid pump (not shown), which is in fluid communications with a liquid reservoir (not shown). The liquid pump and liquid reservoir are located below the countertop 602. In addition, control circuitry (not shown) and a power supply (not shown) are also located below the countertop 602. An IR emitter 620 and IR receiver 630 are located in the upward extending portion 605 of housing 604. It has been found that having the IR emitter 620 and the IR receiver 630 arranged in a vertical orientation result in increased hand sensing accuracy and fewer false triggering s.

As described above, IR emitter 620 has an IR emitter alignment axis (not shown) and IR receiver 630 has an IR receiver alignment axis (not shown) that are configured to intersect at a selected angle of intersection as described above. IR emitter has an IR emission cone 624 that has a smaller diameter than the IR receiving cone 634 of IR receiver 630. The intersection between IR emission cone 624 and IR receiving cone 634 at least partially define a detection zone 640.

FIGS. 6A-6D are exemplary embodiments of a counter mount dispenser 600A. dispenser 600A is similar to dispenser 600 and like parts are not redescribed herein. In this exemplary embodiment, IR emitter 620A is mounted to a circuit board 695 at a downward facing angle A. IR receiver 630A is mounted to circuit board 695 at an upward facing angle A. In this embodiment, downward facing angle A is the same angle as upward facing angle A. In some embodiments, angle A is between 10 and 25 degrees. In some embodiments, angle A is between 12 and 23 degrees. In some embodiments, angle A is between 14 and 21 degrees. In some embodiments, angle A is between 16 and 19 degrees. In some embodiments, angle A is about 17 degrees. In some exemplary embodiments, the vertical distance between IR emitter 620A and IR receiver 630A and the angle A is configured to place the intersection of the IR emitter alignment axis and the IR receiver alignment axis, directly below the dispensing outlet.

Figure 6A:
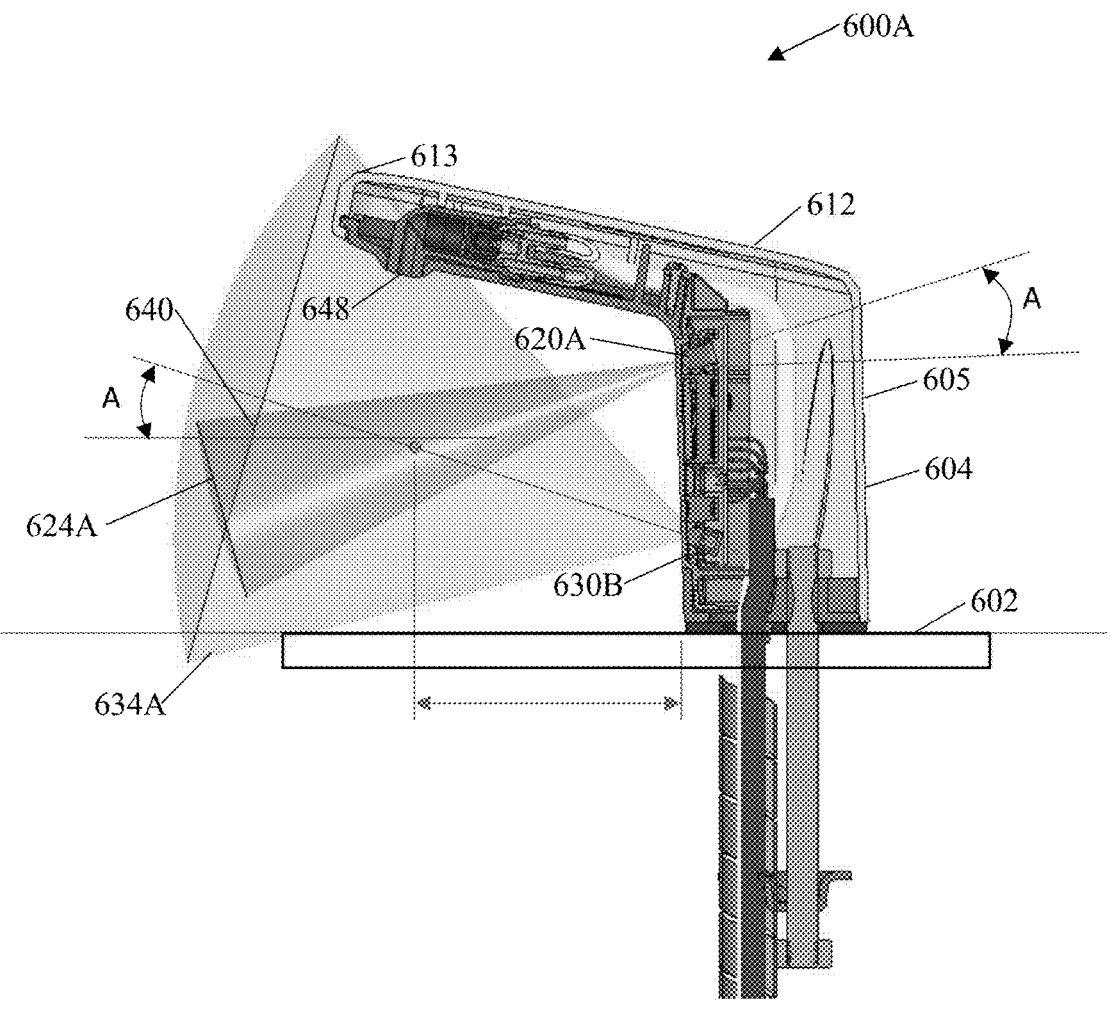
FIGS. 6A and 6C are cross-sectional views of a portion of another exemplary embodiment of a dispenser with an improved hand sensor.
Figure 6B:
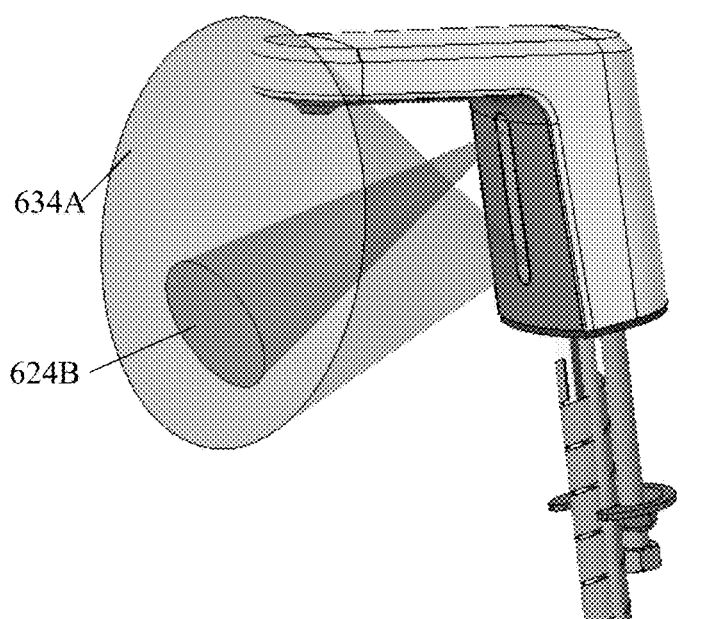
FIGS. 6B and 6D are prospective views of the portion of the exemplary embodiment of a dispenser with an improved hand sensor of FIGS. 6A and 6C showing the detection zones.
Figure 6C:
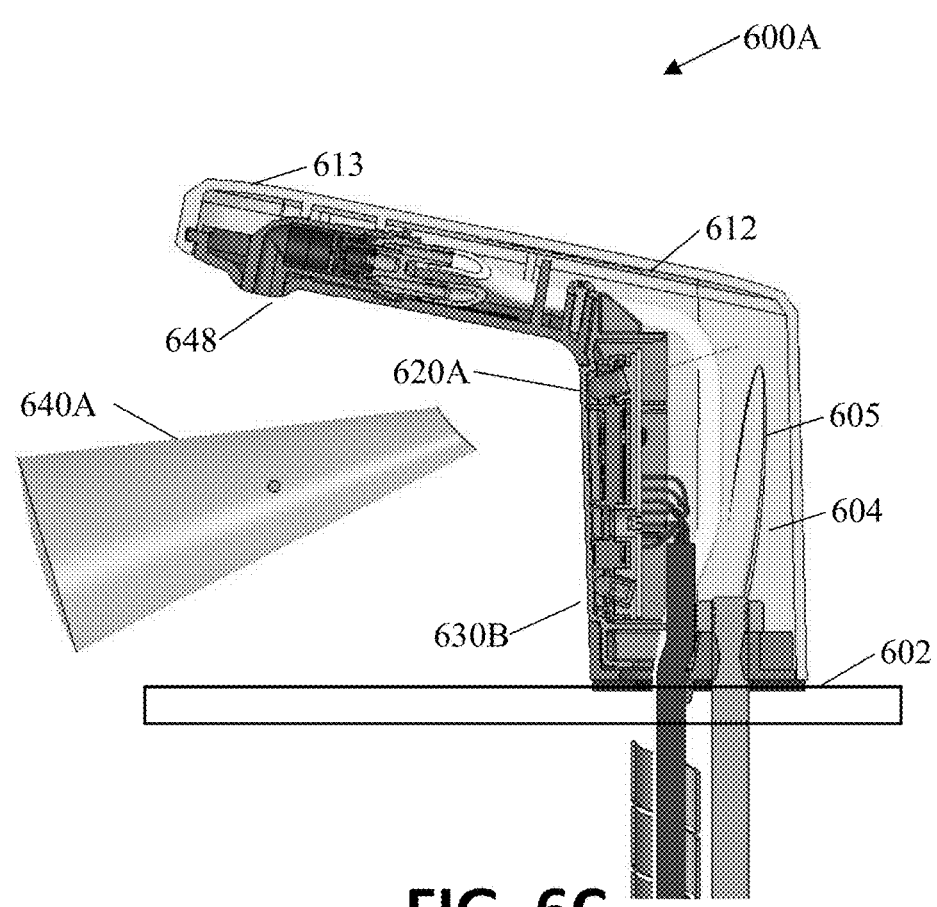
Figure 6D:
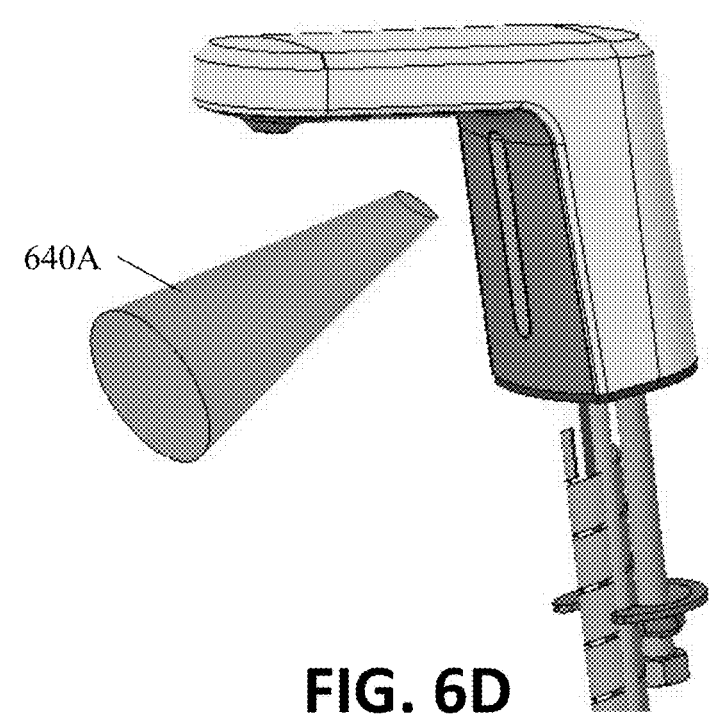

FIG. 6A is a cross sectional view and illustrates IR emission cone 324A having a smaller diameter than IR receiving cone 634A. FIG. 6B is a prospective view of emission cone 324A and IR receiving cone 634A. FIG. 6C is a cross sectional view and illustrates the detection zone 640A, which is the area where IR emission cone 324A and IR receiving cone 634A intersect. FIG. 6D is a prospective view of the detection zone 640A.

FIGS. 7A and 7B are an exemplary embodiment of a tabletop dispenser 700. Tabletop dispenser 700 includes a base 702, which is a container for holding a fluid to be dispensed and a dispenser 703. Tabletop dispenser 700 includes a body 703. Body 703 has a base portion 704, an upright portion 705 and a forward extending portion 712. Dispenser body 703 includes an IR emitter 720 and IR receiver 730 that are located in the upward extending portion 705 of dispenser body 703.

As described above, IR emitter 720 has an IR emitter alignment axis 722 and IR receiver 730 has an IR receiver alignment axis 732 that are configured to intersect at a selected angle of intersection as described above. IR emitter 720 has an IR emission cone 724 that has a smaller diameter than the IR receiving cone 734 of IR receiver 730. The intersection between IR emission cone 724 and IR receiving cone 734 at least partially define a detection zone 740. In this exemplary embodiment, the IR emitter 720 and/or IR receiver 730 have been calibrated to a set distance, which provides an outer limit 770 on the detection zone 740.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. It is not the intention of the applicant to restrict or in any way limit the scope of the appended claims to such detail. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order in which the steps are presented to be construed as required or necessary unless expressly so stated.

We claim:

1. A touch-free dispenser comprising:
a housing;
a dispenser outlet;
a processor;
a memory;
an IR emitter;
an IR receiver;
wherein the IR emitter and the IR receiver are located below the dispensing outlet;
wherein the IR emitter and the IR receiver are separate from one another by a selected distance;
wherein the IR emitter and the IR receiver are arranged in a vertical orientation,
wherein the IR emitter has an IR emitter alignment axis;
wherein the IR emitter has an alignment axis that is non-horizontal;
wherein the IR receiver has an IR receiver alignment axis;
wherein the IR emitter has an alignment axis that is non-horizontal;
wherein the IR emitter alignment axis intersects with the IR receiver alignment axis; and
wherein a detection zone includes the intersection of IR emitter alignment axis and the IR receiver alignment axis.

2. The touch-free dispenser of claim 1 wherein the IR emitter has an IR emission cone symmetric about the IR emitter alignment axis and wherein the IR receiver has an IR detection cone symmetric about the IR emitter alignment axis.

3. The touch-free dispenser of claim 2 wherein the IR emitter emission cone has an emission cone diameter at a selected distance from the IR emitter and wherein the IR receiver detection cone has a detection cone diameter at the selected distance from the IR emitter and wherein the IR emission cone diameter is the same diameter as the IR detection cone diameter.

4. The touch-free dispenser of claim 2 wherein the IR emitter emission cone has an emission cone diameter at a selected distance from the IR emitter and wherein the IR receiver detection cone has a detection cone diameter at the selected distance from the IR emitter and wherein the IR emission cone diameter is a smaller diameter then the IR detection cone diameter.

5. The touch-free dispenser of claim 2 wherein the detection zone is located within an area at least partially bound by the intersection of the IR emission cone and the IR receiver cone.

6. The touch-free dispenser of claim 2 wherein the detection zone is located within an area bound by the intersection of the IR emission cone and the IR receiver cone.

7. The touch-free dispenser of claim 1 wherein the IR emitter is located above the IR receiver.

8. The touch-free dispenser of claim 1 wherein the IR emitter is located below the IR receiver.

9. The touch-free dispenser of claim 1 wherein the IR emitter is located at least one centimeter away from the IR receiver.

10. The touch-free dispenser of claim 1 wherein a center or of the IR emitter, center of the IR receiver and a center of the dispensing outlet are in a plane.

11. The touch-free dispenser of claim 1 wherein the IR emitter alignment axis is between about 15 degrees and 30 degrees from a horizontal axis.

12. The touch-free dispenser of claim 1 wherein the IR detector alignment axis is between about 15 degrees and 30 degrees from a horizontal axis.

13. A touch-free dispenser comprising:
a housing;
the housing having an upward extending portion and a forward extending portion;
a dispenser outlet;
wherein the dispenser outlet is located on the forward extending portion;
a processor;
a memory;
an actuator;
an IR sensor, wherein the IR sensor includes:
an IR emitter; and
an IR receiver;
wherein the IR emitter and the IR receiver are located below the dispenser outlet;
wherein the IR emitter and the IR receiver are arranged one above the other,
wherein the IR emitter has an IR emitter alignment axis;
wherein the IR receiver has an IR receiver alignment axis;
wherein the IR emitter is secured to the upright extending portion;
wherein the IR receiver is secured to the upright extending portion;
wherein the IR emitter alignment axis and the IR receiver alignment axis converge toward one another;
wherein the IR emitter has an emissions cone;
wherein the IR receiver has a receiver cone;
wherein the emissions cone and the receiver cone intersect;
wherein a diameter of the emissions cone is smaller than the diameter of the receiver cone; and
wherein a detection zone is located in the intersection of the emissions cone and the receiver cone; and
wherein when the IR sensor detects an object in the detection zone, the processor causes the actuator to dispense a dose of fluid.

14. The touch free dispenser of claim 13 wherein the emitter is located above the detector.

15. The touch free dispenser of claim 13 wherein an angle of intersection of the emitter alignment axis and the receiver alignment axis is greater than about 30 degrees.

16. The touch free dispenser of claim 13 wherein an angle of intersection of the emitter alignment axis and the receiver alignment axis is greater than about 35 degrees.

17. The touch free dispenser of claim 13 wherein an angle of intersection of the emitter alignment axis and the receiver alignment axis is greater than about 40 degrees.

18. The touch free dispenser of claim 13 wherein an angle of intersection of the emitter alignment axis and the receiver alignment axis is greater than about 44 degrees.

19. The touch free dispenser of claim 13 wherein the upright housing is configured to mount to a countertop.

20. The touch free dispenser of claim 13 wherein the upright housing is configured to mount to a container for holding a fluid.

21. A touch-free dispenser comprising:

a housing;

the housing having an upward extending portion and a forward extending portion;

a dispensing outlet;

wherein the dispenser outlet is located on the forward extending portion;

a processor;

a memory;

an actuator;

an IR sensor, wherein the IR sensor includes:

an IR emitter; and an IR receiver;

wherein the IR emitter and the IR receiver are located below the dispenser outlet;

wherein the IR emitter is located above the IR receiver;

wherein the IR emitter has an emitter axis is angled along a downward direction;

wherein the IR receiver has a receiver axis that is angled along an upward direction;

wherein the IR emitter has an IR emitter alignment axis;

wherein the IR receiver has an IR receiver alignment axis;

wherein the IR emitter is secured to the upright extending portion;

wherein the IR receiver is secured to the upright extending portion;

wherein the IR emitter alignment axis and the IR receiver alignment axis intersect one another before the IR emitter alignment axis and the IR receiver alignment axis pass an outermost end of the forward extending section of the housing;

wherein the IR emitter has an emissions cone;

wherein the IR receiver has a receiver cone;

wherein a detection zone is located within the intersecting portions of the emissions cone and the receiver cone;

wherein the detection zone is located below the dispensing outlet; and wherein when the IR sensor detects an object in the detection zone, the processor causes the actuator to dispense a dose of fluid.

22. The touch-free dispenser of claim 21 wherein an outer edge of the detection zone is formed at least in part by the intersection of the emissions cone and the receiver cone.

* * * * *